United States Patent [19]

Byers et al.

[11] 3,945,753

[45] Mar. 23, 1976

[54] DRILL BIT DEVICE

[76] Inventors: John E. Byers; Gary L. Byers, both of 2130 Choteau St., Helena, Mont. 59601

[22] Filed: July 29, 1974

[21] Appl. No.: 492,481

[52] U.S. Cl. .............. 408/201; 145/116 R; 408/214

[51] Int. Cl.² .............................. B23B 51/00

[58] Field of Search ........... 408/200, 201, 212, 213, 408/214, 225, 230, 231, 233; 145/116 R

[56] References Cited

UNITED STATES PATENTS

| | | | |
|---|---|---|---|
| 598,142 | 2/1898 | Ferguson | 145/116 R |
| 1,140,988 | 5/1915 | Kunitz | 408/233 X |
| 1,415,317 | 5/1922 | Crawford et al. | 408/213 X |
| 3,687,565 | 8/1972 | Byers et al. | 408/214 X |

*Primary Examiner*—Travis S. McGehee
*Assistant Examiner*—Z. R. Billinsky
*Attorney, Agent, or Firm*—Cole & Jensen

[57] ABSTRACT

Drill bit construction having a removable lead screw and a drill body with a work face comprised of two planar surfaces which geometrically intersect on a diameter line such that the angle between the two surfaces is approximately 170°. A cut-away segment is formed on each side of the body with each of the segments having a cutting edge in the form of a detachable blade which is also provided with a cutting spur on the outer end. The body itself is detachably removable from the drill shaft or shank. The body is also provided with a removable lead screw or guide point.

8 Claims, 4 Drawing Figures

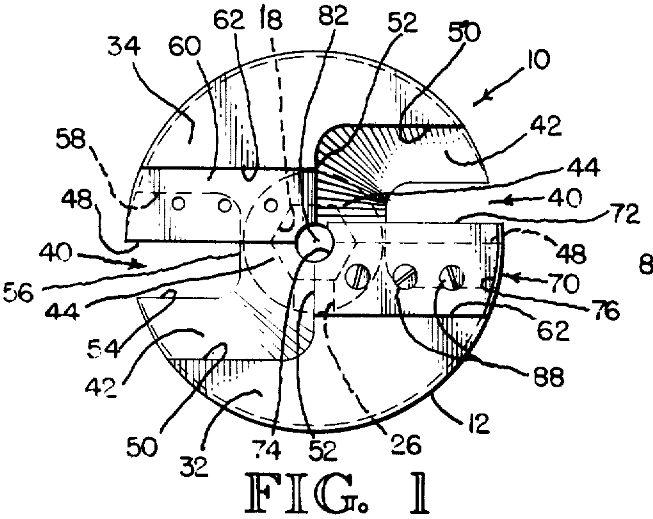
FIG. 1
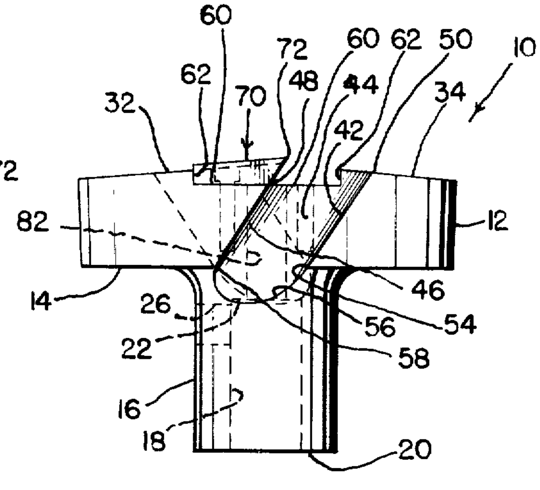
FIG. 3
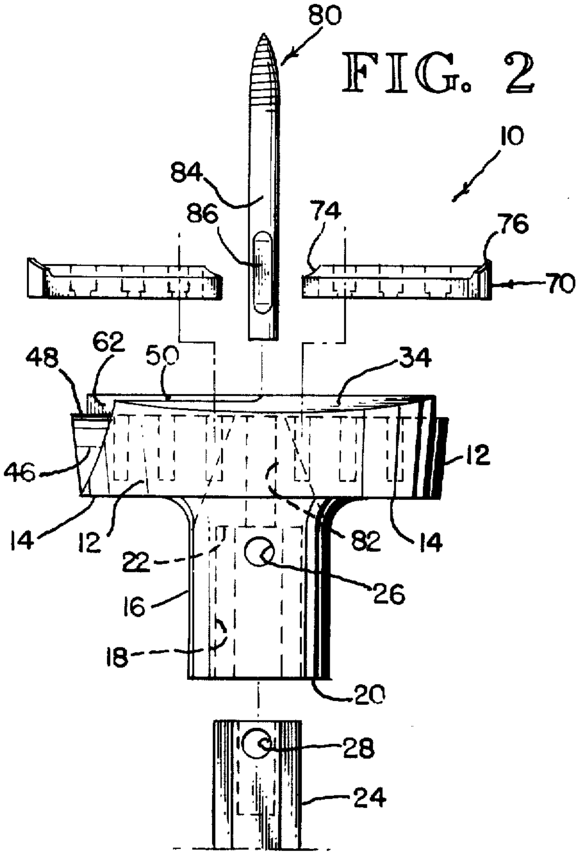
FIG. 2
FIG. 4
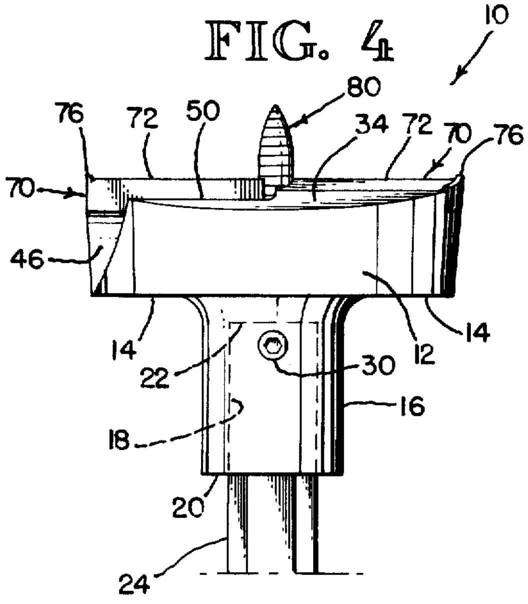

DRILL BIT DEVICE

BACKGROUND OF THE INVENTION

The invention relates in general to boring tools and more specifically to drill bits for a wide variety of applications but particularly for manufacturing and for finish type boring applications.

As those skilled in the art are aware designs of heretofore known drilling bits have been such that they are unable to withstand the severe conditions to which they are at times subjected. Occasionally a boring tool will strike a nail and become nicked and therefore have to be replaced unless it can be reground. Conventional drill bits, if replaced are expensive and regrinding is also a costly operation. Most of the presently known bits are not made substantially or ruggedly enough to remain sharp but in fact must be sharpened or reground frequently. Additionally, known bits are prone to clog and to therefore jam the drill. Furthermore, conventional drill bits will catch or hang up if they emerge in such a way that part of the hole is finished and part is not. In other words, if the drill is through drilling on one side and not the other, the tendency in conventional bits is to jam. Also, because conventional bits are constructed with a so-called flat or radially extending face, it is difficult to enter the wood at an angle since the outer edges of the bit engage the wood before the lead screw. Furthermore, there is a tendancy to mis-align if the lead screw is not taking hold.

Prior art to be considered will be found in U.S. Pat. Nos. 2,681,673; 2,752,965; 2,812,791; 3,165,131; and 3,687,565. None of the cited patents is thought to be pertinent to the structure of this invention.

SUMMARY OF THE INVENTION

The drill bit body is formed basically as a shallow cylinder. The work face, however, is formed of two flat planar surfaces which intersect each other on a diameter line. Each surface extends inwardly toward the diameter line and outwardly from a plane normal to the axis at approximately a 5° angle.

Two cut-away sections are provided which extend through the depth of the body so that shavings and cuttings can be evacuated during drilling. There is provided a recessed portion adjacent each cut-away section to receive a removable blade which has a raised edge or spur portion along the outer edge thereof. A centrally located hole in the body receives a detachable lead screw or pointed guide pin. Located on the back side of the body is a centrally and rearwardly extending shank mounting portion with a hexagonally formed cavity for receiving the hexagonal shaft. The end of the hexagonal shaft itself has a small diameter cavity into which the inner end of the lead screw or guide pin is inserted. A set screw will then enter through the shank receiving portion and extend through a hole in the shaft and come to rest against the lead screw to hold body, shaft and lead screw together in one assembly.

Accordingly, it is among the many features, advantages and objects of this invention to provide a drill bit device which has a body detachable from the drill shaft or extension and which has detachable and replaceable blades. It also has a detachable and replaceable lead screw or guide pin. The geometry of the body is such that two flat planar surfaces intersect along the diameter line at an angle to each other such that in its solid form a ridge would extend across the working face of the drill bit on a diameter line. The drill bit of this invention can be operated at higher rotating speeds than is possible with conventional drill bits and it is particularly suited to finish type drilling in hole sizes from about 1½ inches to 4⅝ inches. The device is not prone to misalignment and the design configuration is particularly suitable to avoiding jams resulting from clogging. The drill may enter the wood from various angles and because of the replaceability of the various portions of the body there is less expense involved as opposed to a conventional drill bit which would have to be reground or replaced entirely if damaged or badly scored.

BRIEF DESCRIPTION OF DRAWINGS

FIG. 1 is a plan view looking at the cutting face of the invention with one of the blades removed to illustrate details;

FIG. 2 is an exploded view in elevation showing additional details of construction;

FIG. 3 is a side elevation view of the unit of FIG. 1 to further illustrate details of the cut out segments and blade seats; and FIG. 4 shows a side elevation view of the device in its assembled state.

DESCRIPTION OF PREFERRED EMBODIMENT

Referring now to the drawings it will be seen that the drill bit body, generally referred to by the number 10, is a round generally shallow cylinder with side walls 12, a rear surface 14 and a centrally disposed shank receiving portion 16 which includes a hexagonal recess 18. Recess 18 extends from the outer end 20 of the shank receiving portion to its inner wall 22 which as can be seen is near the plane of rear surface 14. Hexagonal cavity 18 receives shank 24 which can be detachably secured to the drill itself. It will be noted that the shank receiving section is provided with set screw hole 26 and that the shank itself is also provided with a threaded set screw hole 28 both of which are aligned when the shank is in place as shown in FIG. 4 and whereby set screw 30 when seated holds the shank in cavity 18.

The geometry of the body is such that side wall 12 has approximately a 2° angle beginning with the front edge as it angles backwardly and inwardly from the outer edge of the work face. Thus the diameter across back surface 14 is slightly less than the diameter as measured across the body from the forward points of the body.

The work face of the drill bit body has two flat planar surfaces 32 and 34. Flat planar surfaces 32 and 34 extend at an angle of approximately 5° outwardly so that if extended they would intersect along a diameter line. Thus the outside angle between the surfaces would be approximately 190° whereas the inside angle between them would be approximately 170°. On opposite sides of the body are cut-away sections extending through the depth of the body, the cut-away sections being generally defined by the number 40. The cut-away sections have a forward wall 42 as determined by direction of rotation, an inner wall 44 and a rear wall 46. It will be noted, particularly by reference to FIGS. 1 and 3, that the upper edge 48 of rear wall 46 is on or near to a diameter line and that the upper edge 50 of the forward wall 42 is on a cord line. The upper edge 52 of inner wall 44 is approximately on a diameter line at 90° to edge 48, thus defining the work face opening of the cut-away sections 40 and locating them as can be seen in opposed quadrants. The openings, as defined by walls 42, 44 and 46, angle rearwardly and towards a more centered rear opening disposition. The back edge 54 of rear wall 42, the back edge 56 of inner wall 44 and the back edge 58 of rear wall 46 define a rear opening which is centrally located with respect to the center portion of the body. Each side of the body is provided with a blade support surface 60 extending rearwardly from edge 48 to rear blade support wall surface 62.

The blades as can be seen, have a cutting edge 70 and are shaped to occupy the recess defined by blade walls 60 and 62 such that the upper surface forms a continuation of its respective flat planar surface. The outer edge is rounded to conform to the shape of body side edge 12. The inner end of the blades have a rounded portion 74 to allow for lead screw 80 which is received in central opening cavity 82 which extends from the working face and opens into shank cavity 18. At the outer edge of the blades there is a short, narrow spur 76 extending the width of the blade which makes an end cut while cutting edge 72 shaves away the wood. Lead screw 80 has a shank portion 84 with a flat section 86 so that when the bit is assembled set screw 30 is fitted tightly against lead screw flat portion 86 to hold it in place. Blades 70 are held in place by screws 88.

What is claimed is:

1. A boring tool, comprising:

a. a generally circular drill bit body in the nature of a solid, shallow cylinder, said body having a back surface, a side edge surface and a working face, said working face being Occasionally a defined by a pair of opposed work surfaces in which at least flat planar portions thereof extend axially forwardly at an angle from a plane normal to the body axis and radially inwardly such that when extended intersect to define an intersection line passing through and normal to the body axis, b. a pair of angling cut-away segments generally in opposed quadrants of the working face such that a segment extends through said body from the back surface to a working surface, said cut-away segments having cutting edges therein, c. a shaft mounting portion located generally centrally of and extending rearwardly from the back surface of said body and containing means for detachably connecting said body to a shaft, d. centrally located hole in the working face of said body which is provided with a lead screw, and e. securing means for detachably holding said body and lead screw together.

2. The drill bit device according to claim 1 and in which said side edge surface angles inwardly from said working face to said back surface at a predetermined small angle.

3. The drill bit device according to claim 2 and in which each of said cut-away segments is provided with a recessed portion in which is located a detachable and replaceable cutting blade having a cutting edge.

4. The drill bit device of claim 3 wherein each of said cutting blades generally comprises a portion of its respective work surface to define a cutting edge which is forward of and parallel to said intersection line and which edge is generally at a right angle to the axis of said body.

5. The drill bit device according to claim 4 and wherein each of said cutting blades is provided with a raised cutting spur at the outer edge thereof.

6. The drill bit device according to claim 5 and wherein each of said cut-away segments opens forward of its respective cutting blade and cutting edge and angles rearwardly through said body to open on said back surface generally centered with respect to a plane through the axis and intersection line.

7. The drill bit device of claim 6 and wherein said cut-away segments on said working face extend generally from near the center of said body to said side edge surface.

8. The drill bit device of claim 7 and wherein said cut-away segments on said back surface extend generally from said shaft mounting portion to said side edge surface.

* * * * *